United States Patent
Hammes

[19]

[11] Patent Number: 6,159,260
[45] Date of Patent: Dec. 12, 2000

[54] FILTER UNIT

[75] Inventor: Frank Hammes, Horn, Switzerland

[73] Assignee: Clinix GmbH, Switzerland

[21] Appl. No.: 09/184,731

[22] Filed: Nov. 2, 1998

[30] Foreign Application Priority Data

Oct. 31, 1997 [EP] European Pat. Off. .............. 97119026

[51] Int. Cl.[7] .................................................. B01D 46/10
[52] U.S. Cl. ................................ 55/502; 55/490; 55/497; 55/504; 55/521
[58] Field of Search .............................. 55/497, 502, 504, 55/521, 498, 499, 503, DIG. 33, DIG. 35, 490, 495, DIG. 31; 210/435

[56] References Cited

U.S. PATENT DOCUMENTS

| | | | |
|---|---|---|---|
| 4,548,626 | 10/1985 | Ackley et al. ...................... | 55/DIG. 35 |
| 4,925,469 | 5/1990 | Clement et al. .......................... | 55/502 |
| 5,141,637 | 8/1992 | Reed et al. ................................ | 55/502 |
| 5,158,077 | 10/1992 | Sundström ....................... | 55/DIG. 35 |
| 5,222,488 | 6/1993 | Forsgren . | |
| 5,227,074 | 7/1993 | Nichols et al. ........................... | 55/490 |
| 5,376,270 | 12/1994 | Spearman ................................ | 55/521 |
| 5,435,915 | 7/1995 | Connors, Jr. ............................. | 55/502 |
| 5,489,352 | 2/1996 | Spearman ................................ | 55/521 |
| 5,599,448 | 2/1997 | Spearman ................................ | 55/521 |
| 5,667,545 | 9/1997 | Honda et al. ............................ | 55/502 |
| 5,685,985 | 11/1997 | Brown et al. ............................ | 55/502 |
| 5,690,712 | 11/1997 | Engel ....................................... | 55/502 |
| 5,730,766 | 3/1998 | Clements ................................. | 55/502 |
| 5,730,769 | 3/1998 | Dungs et al. ............................ | 55/502 |
| 5,800,581 | 9/1998 | Gielink et al. ........................... | 55/502 |
| 5,853,445 | 12/1998 | Wong et al. ............................. | 55/502 |
| 5,876,471 | 3/1999 | Lippert et al. .......................... | 55/502 |

FOREIGN PATENT DOCUMENTS

| | | |
|---|---|---|
| 0 478895 | 3/1994 | European Pat. Off. . |
| 3441918 | 4/1986 | Germany . |
| WO 94/01200 | 1/1994 | WIPO . |

*Primary Examiner*—David A. Simmons
*Assistant Examiner*—Minh-Chau T. Pham
*Attorney, Agent, or Firm*—Baker & Maxham

[57] ABSTRACT

A filter unit with a filter element receptacle and a filter element, where the filter element having a filter element box in which is inserted a filter pack or a filter medium. The filter element box has a filter element cover on which there is a peripheral projection which engages in a corresponding taper on the filter element box. In addition, the filter element can be inserted into the filter element receptacle which engages with a sealing effect in at least one corresponding packing groove of the filter element cover or box with at least one sealing web molded onto it.

28 Claims, 8 Drawing Sheets

FILTER UNIT

BACKGROUND

1. Field of the Invention

This invention concerns a filter unit having a receptacle and a filter element which can be inserted into the receptacle, and comprises a filter element box into which can be inserted a filter pack or some other filter medium.

2. Discussion of the Related Art

Filter elements are used today in large numbers in ventilation and clean room technology. They consist of a stable frame with a filter pack of a folded filter medium cast integrally with it. These filter elements, specifically filter elements with suspended particles, must be absolutely tight, that is, they must not have any holes or passages through which the medium to be filtered can flow past the filter element. The filter elements are then secured individually or in combination with other filter elements in the filter receptacles of ventilation systems and equipment. The gasket between the filter element and filter receptacle is critical here because otherwise air, seeking the least resistance, can pass by the filter element without being filtered. To prevent this, a sealing element such as a rubber gasket is placed between the filter element and filter receptacle.

The known filter elements and their filter receptacles typically have the disadvantage that they have a relatively complicated design to meet the above-mentioned requirements of the seal. This makes their manufacture labor intensive and material intensive, and it poses problems in environmentally safe disposal.

The above statements also apply in a related sense to filter elements for liquid media such as water or oil filters.

SUMMARY OF THE INVENTION

A primary purpose of the present invention is to improve upon a filter unit of the type described in the preamble in such a way as to yield a simple, inexpensive and environmentally friendly design.

Another purpose is to provide a filter unit according to the present invention which will reliably prevent so-called leakage flow within the filter element and between the filter element and filter element receptacle.

This object is achieved according to the present invention by a filter unit comprising a filter element receptacle with a filter element, where the filter element has a filter element box in which is inserted a filter pack or a filter medium. The filter element box has a filter element cover on which is arranged a peripheral projection which engages in a respective taper on the filter element box. The filter element can be inserted into the filter element receptacle, where the filter element receptacle with a sealing web molded onto it engages in at least one respective packing groove on the filter element cover or box to form a seal.

According to the present invention, the filter unit described here consists of a filter element box with a respective filter element cover and with a suitable filter pack accommodated in the box. Due to the special design of the box and cover and their assembly in the manner of a tongue and groove joint, the filter pack is held absolutely tightly in the box without requiring any additional sealing elements such as rubber or silicone gaskets. The filter element box and cover are preferably made of expanded polystyrene (EPS).

The filter element can then be inserted into a suitable filter element receptacle, which engages in respective packing grooves on the filter element cover or box with molded-on sealing webs to form a seal. Here again, no additional rubber or silicone gaskets are necessary for the sealing effect.

The design of a filter element described here and its use in the corresponding filter element receptacle offer the following advantages in comparison with traditional filter elements and filter receptacles:

Using two molded parts made of EPS in the frame structure yields substantial material savings in comparison with frame structures made of metal or particleboard. Tool and die costs for EPS molds are much more favorable than injection molds for frame structures made of traditional thermoplastics.

Saving processing costs because the frame structure, including the gasket, consists of only two parts, the filter element box and the filter element cover, which can be joined together easily; introducing the adhesive into the peripheral clearance between the filter element box and the filter pack and pressing the cover onto the box.

The filter element itself does not contain any metal and thus it can be incinerated completely.

The filter element is very lightweight and can be compacted by applying a low force. This reduces disposal costs.

No additional rubber or silicone gaskets are required.

There is no wear on the gasket because the filter element receptacle does not have any wearing components, such as gaskets.

There is a savings in processing costs because with mini-pleat filter packs with edge sealing, it is not necessary to encapsulate the open fold sides. The seal is achieved by applying adhesive in the corresponding clearance.

The amount of material in the frame structure is low in relation to the filter area. This means a low waste/performance ratio.

It may be advantageous for the filter pack to be a pleated filter medium which is held together by means of adhesive bead spacers by the known mini-pleat method (special folding method).

As an alternative, a filter pack consisting of one or more layers of non-woven material may also be used.

According to a preferred embodiment of the filter unit, the filter element receptacle is designed by the modular principle in such a way that multiple filter element receptacles can be stacked one above the other in any order. The filter element receptacles are designed so that the tapering top edge of the receptacle engages in a groove in the sealing seat formed by a shoulder bent at a right angle. A suitable sealing medium is provided in the groove. This yields an absolutely tight joint and a clean, anti-vibration sealing fit between the engaged filter element receptacles. This sealing medium also reduces the transmission of vibrations between the filter element receptacles.

As long as the filter element receptacles are designed the same at the top edge and in the lower area, they may differ in height.

The filter element receptacles can be clamped together from the outside with various clamps or gripping devices.

A fan part designed as a tube fan with the same top edge design and the same right-angle projection as the filter element receptacle can be connected anywhere upstream or downstream from the filter element receptacles or in between.

Because of the modular design of the filter element receptacles and their universal stackability, it is now readily possible to interchange the individual filter element receptacles. Any combination of filter stages can also be achieved by lining up the filter receptacles in any order.

In a preferred embodiment of the present invention, the filter element receptacle is designed with double walls, that is, it has an inside wall and an outside wall. It is preferable here if the interspace or a part of the interspace between the inside wall and the outside wall is filled with a material that absorbs airborne noise or structure-borne noise.

In another embodiment of this invention, the filter elements are held in the respective filter element receptacles by easily released filter clamps. The filter clamps are inserted into the interspace between the inside wall and the outside wall under frictional connection with tensioning elements, and are arranged displaceable and detectably in the area of vertically aligned longitudinal slots in the respective inside wall of the respective filter element receptacle.

BRIEF DESCRIPTION OF THE DRAWING

The objects, advantages and features of the invention will be more clearly understood from the following detailed description when read in conjunction with the accompanying drawing, in which.

DETAILED DESCRIPTION OF THE PREFERRED EMBODIMENTS

Description of Individual Components

Figure 1:
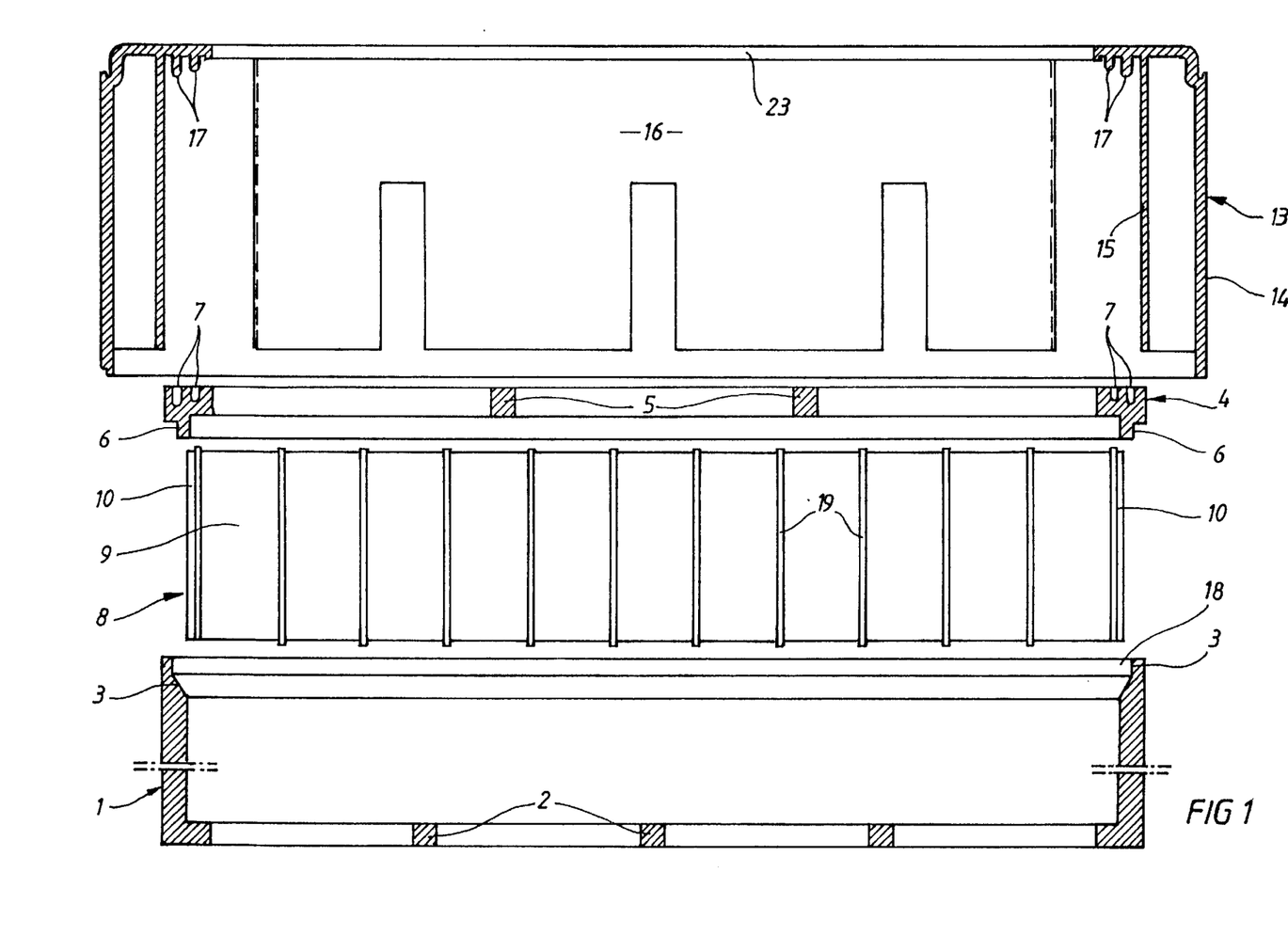
FIG. 1 is a section through the filter unit according to the present invention with the filter element and filter element receptacle in a dismantled state.

With reference now to the drawing, and more particularly to FIG. 1, the filter unit of the invention consists of filter element box 1 and filter element cover 4. The two parts 1, 4 each consists of a molded part of expanded polystyrene (EPS) or a similar material that is flexible but has a stable structure. Filter element box 1 is rectangular with a framework design. On one side the box is held together with braces 2. It is open on the other side and the box wall has a taper 3 toward the outside.

The filter element cover 4 consists of a peripheral rectangular frame reinforced with braces 5 on the inside for stability. On the side placed on box 1, the cover has a peripheral projection 6, which protrudes into box 1, when cover 4 is placed on box 1 in the area of taper 3. Cover 4 has one or more peripheral packing grooves 7 on the other side. As an alternative, the packing grooves may also be integrated into the bottom of the box.

Filter pack 8 consists of pleated filter medium 9 which is held together by means of adhesive bead spacers 19 in the known mini-pleat method (special folding method). On the two open sides, filter pack 8 is sealed to the outside in the edge area with an edge sealing adhesive bead 10 forming a seal between the folds in the known edge sealing method. This yields a type of filter pocket, so that air can no longer flow past the two sides, where otherwise the folds would be open to the outside.

The edge sealing is supplemented perfectly by gluing the filter pack in the filter frame by filling peripheral clearance 18 and attachment of the cover. The air to be filtered can then flow only through the filter pack.

Figure 3:
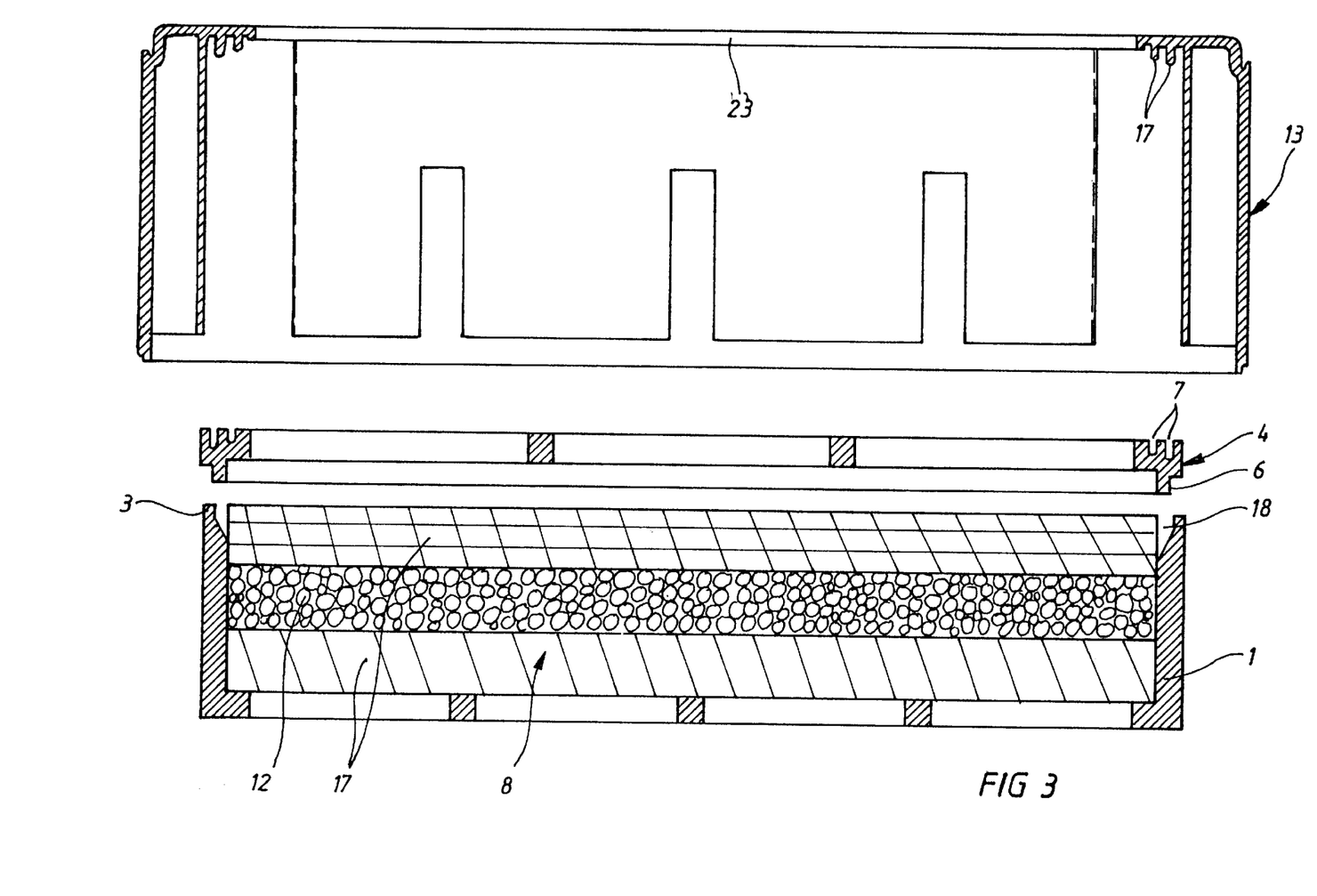
FIG. 3 is a section through another embodiment of the filter unit of the invention with the filter element and filter element receptacle in a dismantled state.

As an alternative to the folded filter, filter pack 8 may also consist of one or more layers of non-woven material 11 several millimeters thick, as shown in FIG. 3. Various adsorbent media 12 such as activated carbon may be placed between the layers of non-woven material.

Filter element receptacle 13 includes a stable, approximately rectangular outside wall with inside walls 15 optionally at a distance from the outside wall, defining a recess 16. Therefore, the filter element receptacle is completely open on one side and has a relatively large passage 23 on the other side for the medium to be filtered. In the area of the upper or lower flat side, the receptacle has one or more peripheral sealing webs 17 facing into the interior of the filter element receptacle. Outside wall 14 may be made of plastic, metal or a similarly stable material and forms a permanent part of a filter system, a filtration unit or an air purification device or an air purification system.

Assembly of the Filter Element

Figure 2:
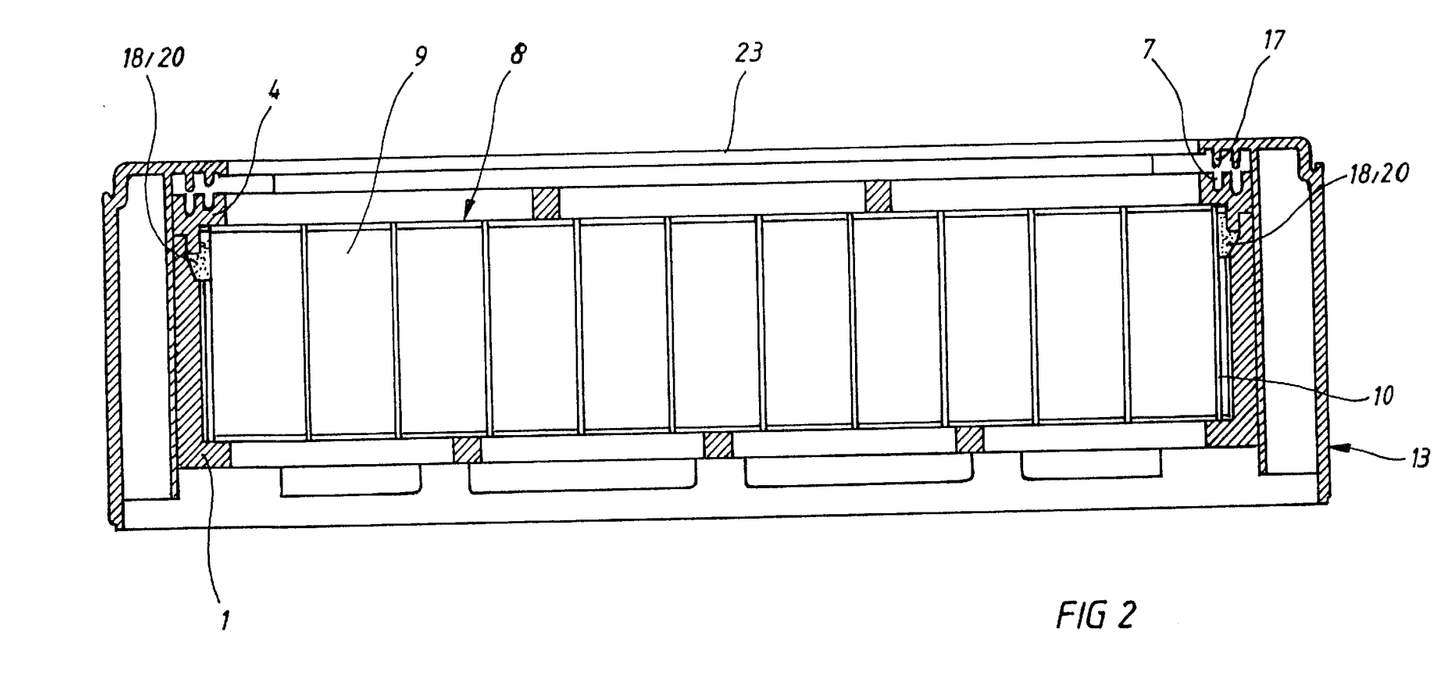
FIG. 2 is a section through the assembled filter element of FIG. 1 with a mini-pleat filter pack when inserted into the filter element receptacle.

First, filter pack 8 is inserted into filter element box 1 from the open side of the filter element box. When using a mini-pleat filter pack, it is inserted with the side facing up into the filter element box to which is applied the edge sealing adhesive bead 10. The inserted filter pack 8 is higher than the shoulder of taper 3 at the upper edge of box 1, that is, filter pack 8 projects beyond the shoulder of taper 3. Thus, there remains a peripheral clearance 18 between box 1 and filter pack 8 (FIGS. 1 and 3). This clearance 18 is then filled with hot glue or other adhesive 20 (FIG. 2). When using a mini-pleat filter pack, the adhesive flows to edge sealing adhesive bead 10 and thus forms a complete seal and joint between edge sealing adhesive bead and the lateral upper edge of the filter element box 1. While the hot glue is still soft and has not yet solidified, the filter element cover 4 is placed on box 1 and pressed downwardly. This causes the peripheral projection 6 of cover 4 to project into peripheral clearance 18 filled with adhesive. As soon as the adhesive dries, it forms a secure and absolutely tight connection between cover 4 and box 1.

Installation of the Filter Element in the Corresponding Filter Receptacle

Traditional replaceable filter elements are usually inserted into the filter element receptacle, usually together with rubber or silicone gaskets to prevent the medium to be filtered from flowing past and achieving a reliable sealing effect.

With the filter element according to the present invention, the seal is achieved by one or more packing grooves 7 in filter element cover 4 or box 1 (not shown) and one or more corresponding sealing webs 17 in filter element receptacle 13.

According to FIG. 2, the filter element is inserted into recess 16 of filter element receptacle 13 in such a way that sealing webs 17 of the filter element receptacle engage with packing grooves 7 of filter element cover 4.

The strong but flexible material of filter element cover 4 is essential here. The seal here is achieved by two processes, which may be used alone or in combination.

First, the seal is achieved by pressing rigid sealing web(s) 17 into the slightly narrower packing groove(s) 7. The seal is formed by the lateral pressure of the flexible material on sealing webs 17. Second, the seal is achieved by placement and insertion of the top edge of sealing web 17 into the bottom of the slightly shorter packing groove 7 in filter element cover 4. The seal here is formed on the top edge of sealing web 17.

The filter element can be secured and put under pressure in filter element receptacle 4 by means of various clamps or snap closures (see below).

The oncoming flow to the filter element is preferably such that the filter element is pressed by the flow into filter element receptacle 13 and against sealing web 17 (as seen in FIG. 2, oncoming flow is from below).

If it seems necessary in special applications, a sealing compound such as silicone paste can be placed in packing grooves 7 to thereby increase the sealing effect.

Figure 4:
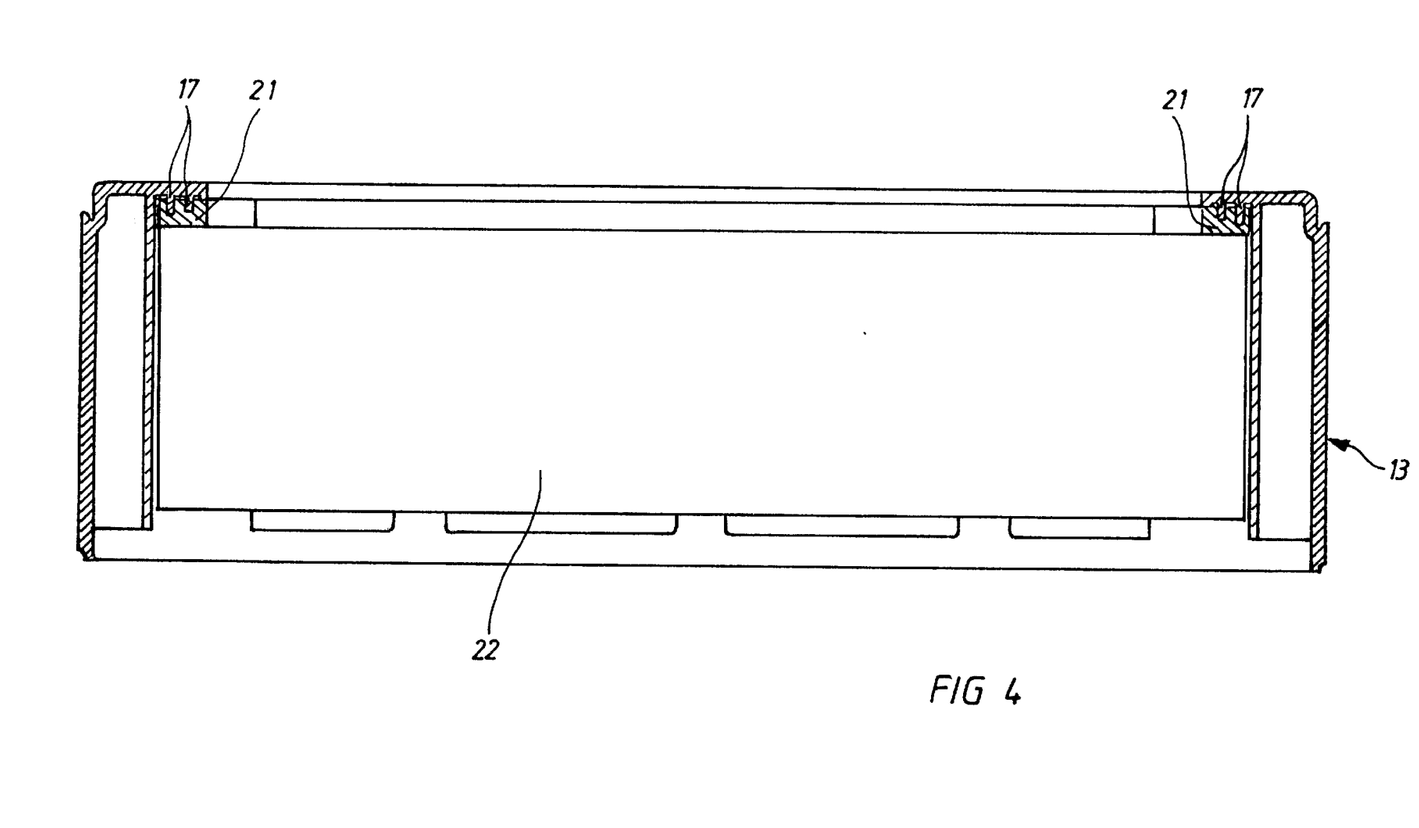
FIG. 4 is a traditional filter element inserted into the filter element receptacle in accordance with the invention.

FIG. 4 shows that it is also possible to use traditional filter elements 22 without packing grooves 7 in filter element receptacle 13. To do so, a rubber section 21 with packing grooves provided in it or something similar is placed on sealing webs 17 of filter element receptacle 13, thus yielding a flat contact surface for filter element 22. A good seal is guaranteed by the elasticity of rubber section 21.

Figures 5, 5A:
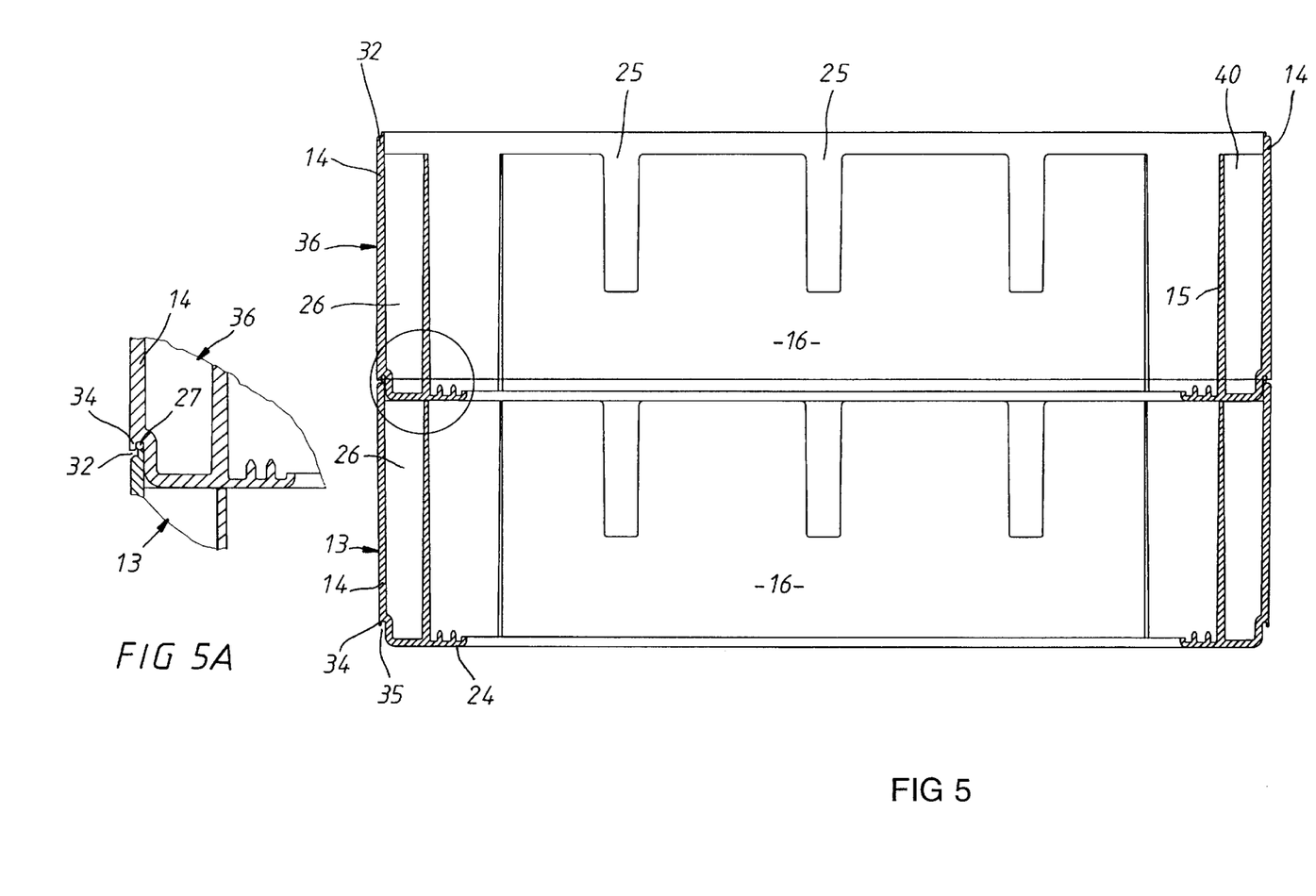
FIG. 5 is a section of two filter element receptacles arranged one above the other without filter elements, in accordance with this invention.
FIG. 5A is an enlarged partial view of the sealing seat according to FIG. 5.

FIG. 5 shows a sectional view of a modular-design filter unit consisting of a connection of two filter element receptacles 13, 36 which are sealingly joined at the seat shown.

It can be seen here that each filter element receptacle 13, 36 consists of an approximately pan-shaped structure and has double walls, as also shown in FIGS. 1–4. Each filter element receptacle 13, 36 has an outside wall 14 and, extending around all or part of the periphery, an inside wall 15 designed as a holder for the filter medium. Filter element receptacles 13, 36, in particular the filter element receptacle 36 at the top, each has a shoulder 34 with a right angle bend, forming peripheral groove 35 into which packing cord 27 can be inserted. The top edge 32 of outside wall 14 of the lower filter element receptacle 13 engages with a sealing effect in this groove 35, as shown especially in FIG. 5A. The engagement of two or more filter element receptacles 13, 36 or fan units yields a very stable design of the overall filter unit. Due to the fact that the tapered area of upper filter element receptacle 36 is partially inserted into interspace 26 of lower filter element receptacle 13, the filter element receptacles are centered with respect to one another and lateral slippage is prevented.

Figure 6:
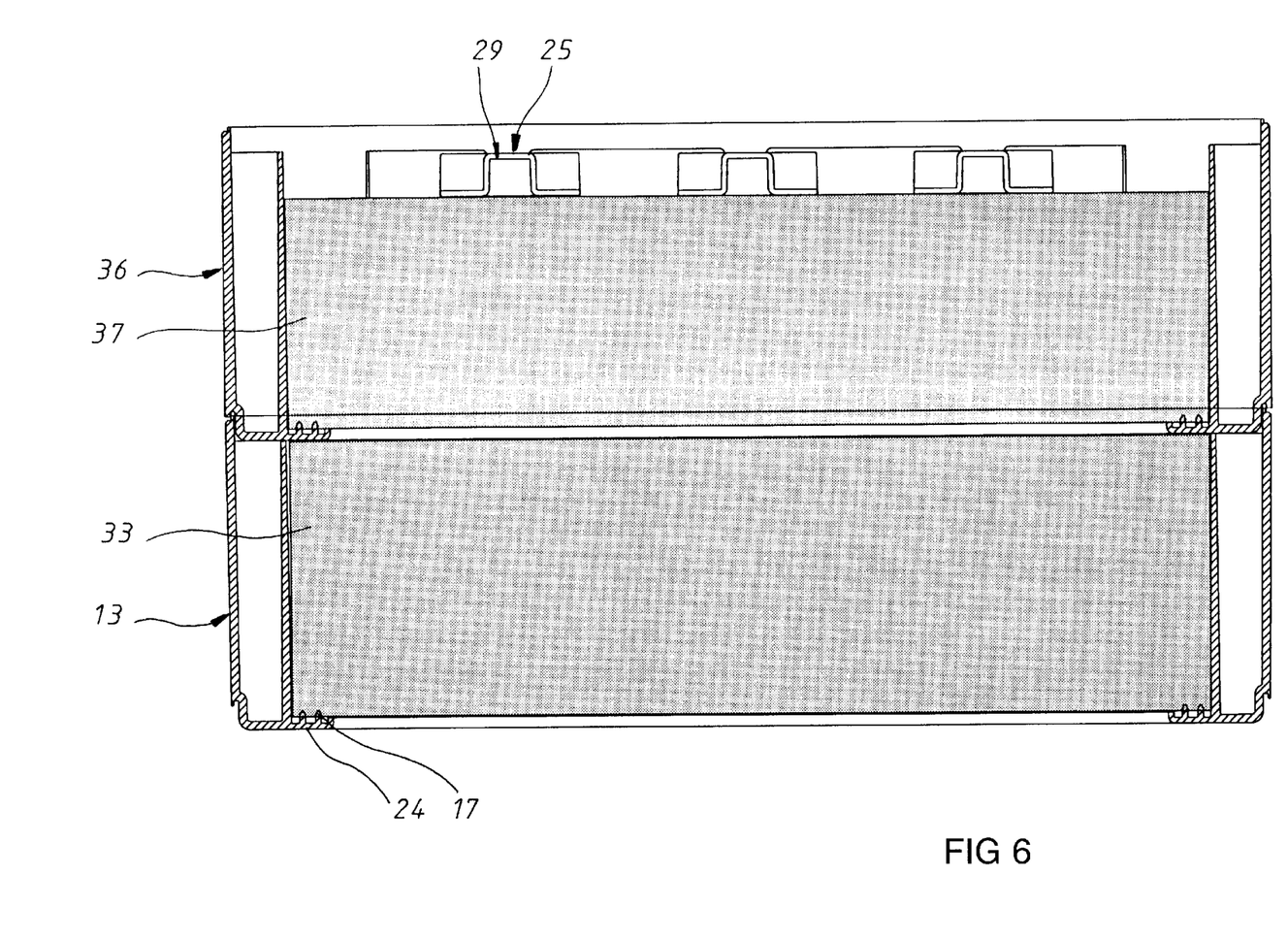
FIG. 6 is a section of two filter element receptacles arranged one above the other with filter elements in accordance with the invention.

As also shown in FIGS. 5 and 6, there is a peripheral, self-contained outside wall 14 which is a distance away from inside peripheral wall 15, forming an interspace 26 between them. This interspace 26 is preferably filled with a material having a sound absorbing or sound attenuating effect.

Figure 7A:
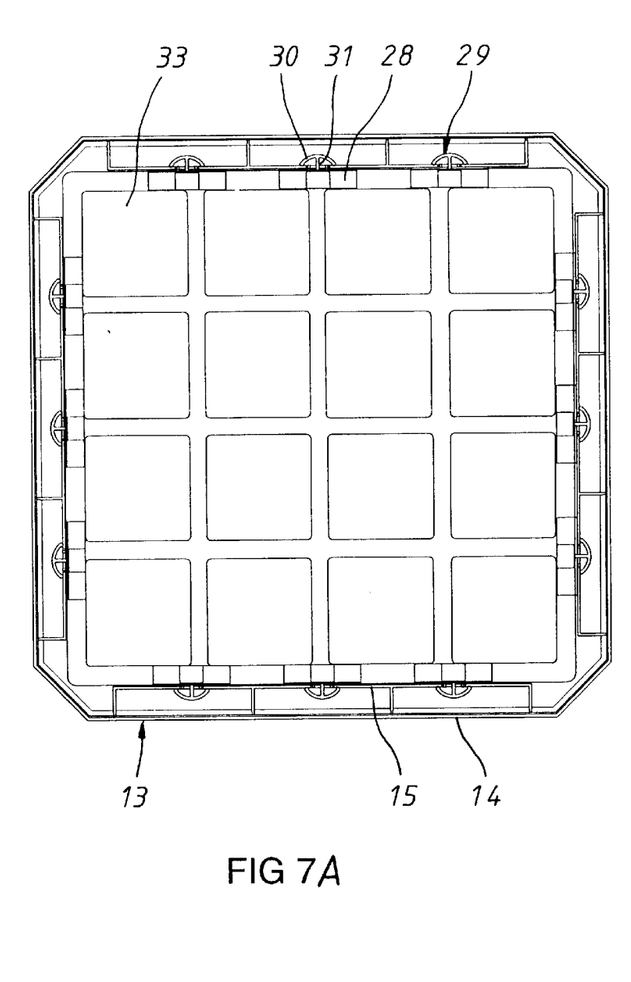
FIG. 7A is a top view of a filter element receptacle of the invention with a filter element and filter clamps.
Figure 7B:
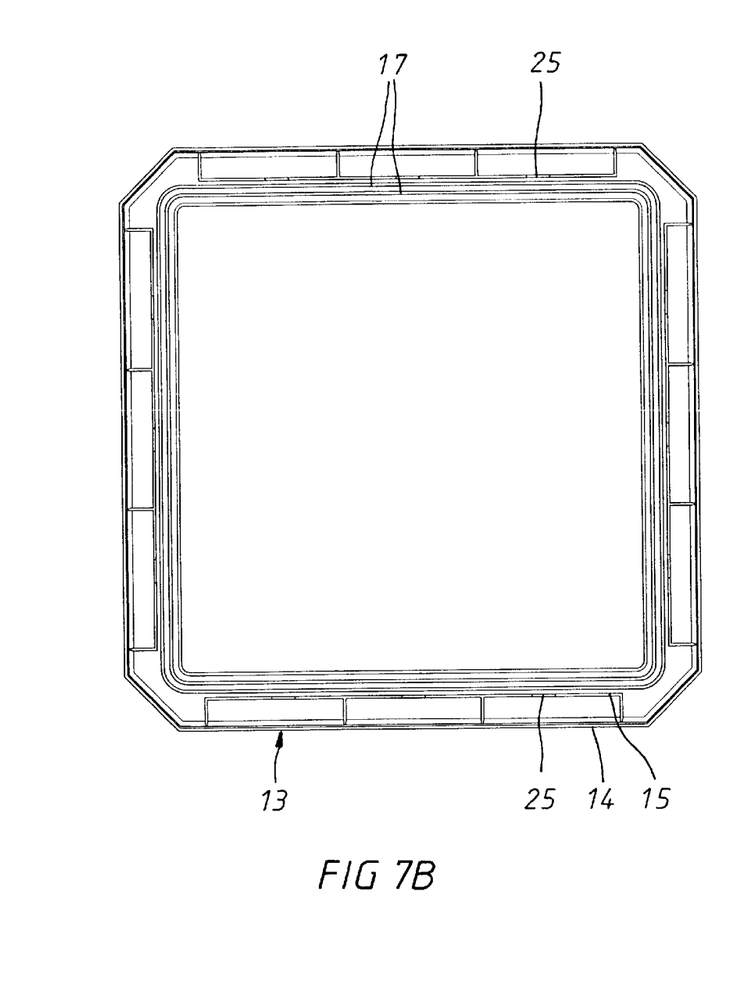
FIG. 7B is a top view of a filter element receptacle of FIG. 7A without a filter element or filter clamps.

As shown in FIGS. 6, 7A and 7B, longitudinal slots 25 running vertically and parallel to one another with a distance between them are provided in inside wall 15. A filter clamp 29, consisting essentially of an inside clamp pad 28 and a web 31 joined in one piece to clamp pad 28 and made of the same material, is inserted into these longitudinal slots 25 with a clamping effect, the web passing through the respective longitudinal slot 25 and joined at its outer end to an approximately U-shaped tensioning element 30 whose free outer ends are in 20 clamping contact with the outside surfaces of inside wall 15 with friction contact.

Filter element receptacle 13 forms a central inside recess 16, which is bordered toward the outside, in the direction of inside wall 15, by a peripheral stop wall 24 with an approximately horizontal inclination. Filter element 33 is placed on this stop wall 24 together with the peripheral sealing webs 17, with all clamp pads 28 removed from their longitudinal slots 25. After inserting filter element 33 into recess 16, clamp pads 28 are inserted into longitudinal slots 25 and pushed down, so that these clamp pads then come to lie against the upper peripheral edge of filter element 33 with a clamping action, as illustrated in FIG. 8.

When two filter element receptacles 13, 36 are arranged one above the other in the sealing seat, stop wall 24 can serve to press a filter element below it in the filter element receptacle against its stop wall and its packing grooves. The filter element here may be higher and no filter clamps are needed.

Figure 8:
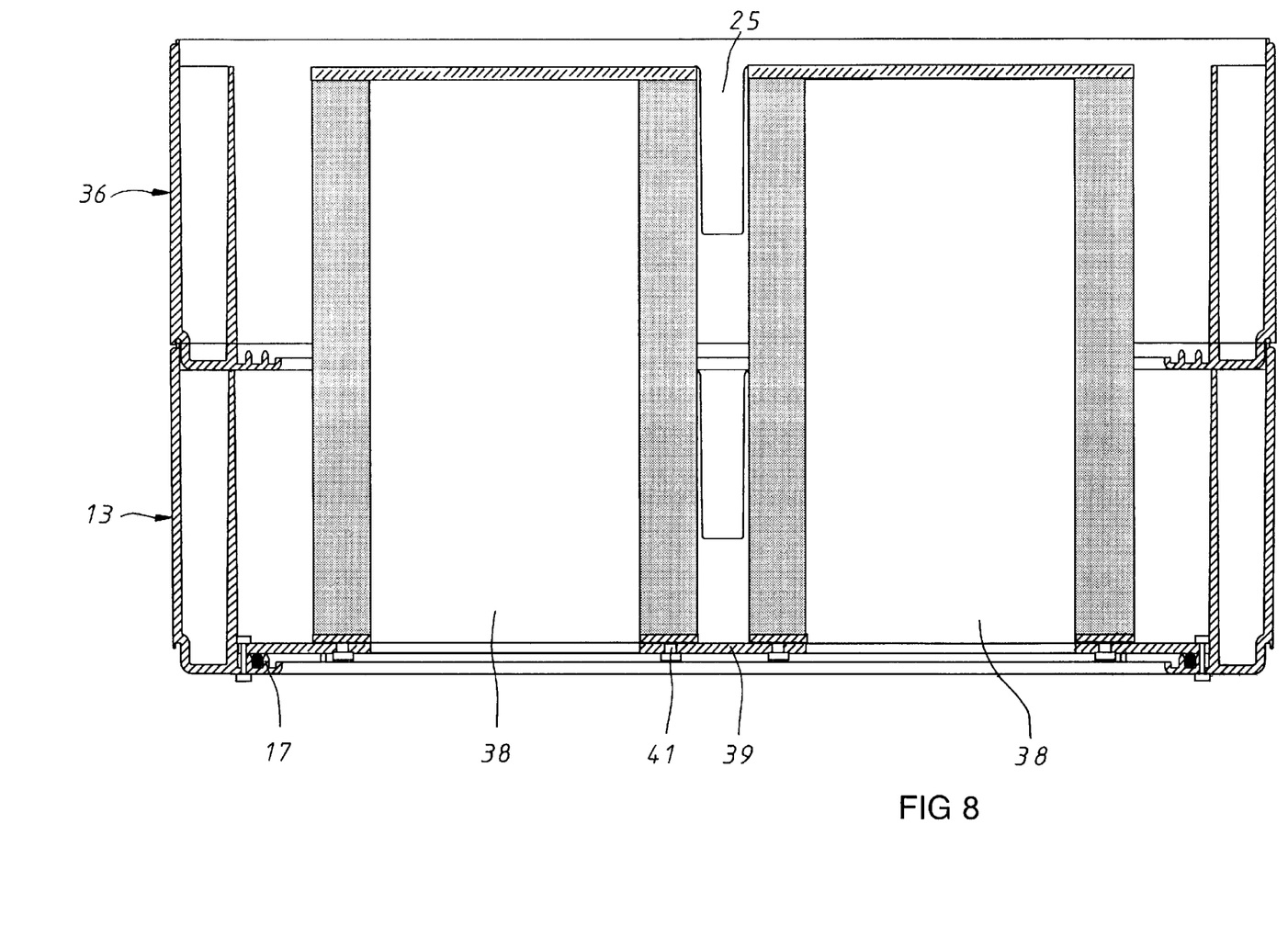
FIG. 8 shows two filter element receptacles arranged one above the other with filter elements guided over the receptacle area of both filter element receptacles.

FIG. 8 shows two filter element receptacles 13, 36 arranged one above the other with filter elements in the form of filter cartridges 38 extending over the length of both filter element receptacles. The lower filter element receptacle 13 is provided with a base plate 39 on which the filter cartridges 38 can be anchored by means of a bayonet closure 41, for example. Base plate 39 is in turn attached to stop wall 24 and is sealed with respect to it by a sealing strip arranged between webs 17.

In view of the above description it is likely that modifications and improvements will occur to those skilled in this technical field which are within the scope of the invention. This invention is to be construed according to the spirit and scope of the appended claims and equivalents thereof.

What is claimed is:

1. A filter unit comprising:
   a filter element receptacle formed with a sealing web; and
   a filter element comprising:
   a filter element box formed with a peripheral inside taper;
   a filter pack in said filter box; and
   a filter element cover formed with a peripheral projection shaped and configured to mate with said taper on said filter element box, said filter element cover also being formed with a packing groove shaped and configured to mate with said sealing web in said filter element receptacle, wherein said packing groove is slightly narrower than said sealing web, thereby sealing said filter element to said receptacle.

2. The filter unit according to claim 1, wherein said filter element box is formed with a packing groove shaped and configured to selectively sealingly mate with said sealing web of said receptacle.

3. The filter unit according to claim 1, wherein said filter pack comprises a pleated filter medium.

4. The filter unit according to claim 1, wherein said filter pack comprises at least one layer of a non-woven material.

5. The filter unit according to claim 4, and further comprising an absorbent medium arranged between the layers of said non-woven material.

6. The filter unit according to claim 1, wherein said filter pack inserted into said filter element box projects beyond the shoulder of said taper on said inside wall of said filter element box.

7. The filter unit according to claim 1, wherein when said filter pack is inserted into said filter box, a peripheral clearance remains between said box and said filter pack in the area of said taper, said filter element further comprises an adhesive in said taper area, wherein said filter element cover is placed on said box and pressed against it before said adhesive solidifies.

8. The filter unit according to claim 1, wherein said filter element cover and said filter element box are each comprised of a molded part of foamed plastic.

9. The filter unit according to claim 1, and further comprising a sealing compound placed in said packing grooves.

10. The filter unit according to claim 1, and further comprising a rubber section formed with packing grooves and stacked on said sealing web so that conventional filter elements can also be used.

11. The filter unit according to claim 1, and further comprising at least two stacked said filter element receptacles with at least one said filter element inserted into each said receptacle.

12. The filter unit according to claim 1, wherein said filter unit comprises a combination of a plurality of said filter stages by mounting a plurality of said filter element receptacles together.

13. The filter unit according to claim 1, and further comprising a fan unit selectively connected upstream, or downstream between said filter element receptacles, said fan unit has a housing which is shaped and configured to couple to the upper and lower housing edges of said filter element receptacles.

14. The filter unit according to claim 1, wherein said filter element receptacle is formed with a shoulder bent at a right angle on the outside of the outside wall thereof, forming a groove for receiving a packing cord.

15. The filter unit according to claim 1, wherein the top edge of the outside wall is formed with a taper and engages with a sealing effect in said groove in said filter element receptacle when two said filter element receptacles are stacked.

16. The filter unit according to claim 1, wherein said filter element receptacle is generally pan-shaped and comprises a self-contained outside wall, said receptacle is formed with an inside wall parallel to and spaced from said outside wall, thereby forming an interspace between said walls, and further comprising insulation material in said interspace.

17. The filter unit according to claim 16, wherein said filter element receptacle is formed with mutually spaced longitudinal slots running vertically in said inside wall parallel to one another and further comprising a filter clamp in each said longitudinal slot which has a clamping action.

18. The filter unit according to claim 17, wherein said filter clamp comprises an inside clamp pad and a web connected in one piece with said clamp pad and made of the same material.

19. The filter unit according to claim 17, wherein said filter clamp passes through said respective longitudinal slot and is connected to a generally U-shaped tensioning element whose free outer end is in contact with said outside surfaces of said inside wall and having a clamping action and friction contact.

20. The filter unit according to claim 18, wherein each said filter element receptacle is formed with a central internal recess which is bordered toward the outside in the direction of said inside wall by a peripheral stop wall with a generally horizontal inclination.

21. The filter unit according to claim 20, wherein after removing all said clamp pads from their said longitudinal slots, said filter element is shaped and configured to be clamped in place on said stop wall by said clamp pads which are inserted back into their respective longitudinal slots and pushed down.

22. The filter unit according to claim 1, wherein said filter element receptacle includes a base plate shaped and configured to receive filter cartridges anchored thereto with a bayonet closure.

23. The filter unit according to claim 1, wherein said filter unit comprises a plurality of said filter element receptacles stacked one above the other wherein at least one filter element is mounted in a recess formed by said filter element receptacles.

24. The filter unit according to claim 1, wherein said filter element receptacle includes a stop wall by means of which one said filter element arranged in one said filter element receptacle below it is pushed downward.

25. The filter unit according to claim 1, wherein said filter unit comprises at least two filter element receptacles engaged with one another due to the fact that a tapered area of the upper filter element receptacle projects partially into the interspace of the lower filter element receptacle, so that the filter element receptacles are mutually centered and lateral slippage is prevented.

26. The filter unit according to claim 1, wherein said filter unit comprises at least one filter element receptacle and one fan unit engaged with one another due to the fact that a tapered area of the upper filter element receptacle projects partially into the interspace of the lower filter element receptacle, so that the filter element receptacles are mutually centered and lateral slippage is prevented.

27. The filter unit according to claim 7, wherein the adhesive seals the filter element box to the filter element cover and also seals the filter pack to the filter element box.

28. A filter unit comprising:
a filter element receptacle formed with a sealing web; and
a filter element comprising:
   a filter element box formed with a peripheral inside taper;
   a filter pack in said filter box;
   a filter element cover formed with a peripheral projection shaped and configured to mate with said taper on said filter element box, said filter element cover also being formed with a packing groove shaped and configured to mate with said sealing web in said filter element receptacle, thereby sealing said filter element to said receptacle; and
   an adhesive in said peripheral inside taper that seals the filter element box to the filter element cover and also seals the filter pack to the filter element box.

* * * * *